April 13, 1954  K. T. KELLER  2,675,065
SPRING CUSHION STRUCTURE
Filed Aug. 14, 1948  2 Sheets-Sheet 1
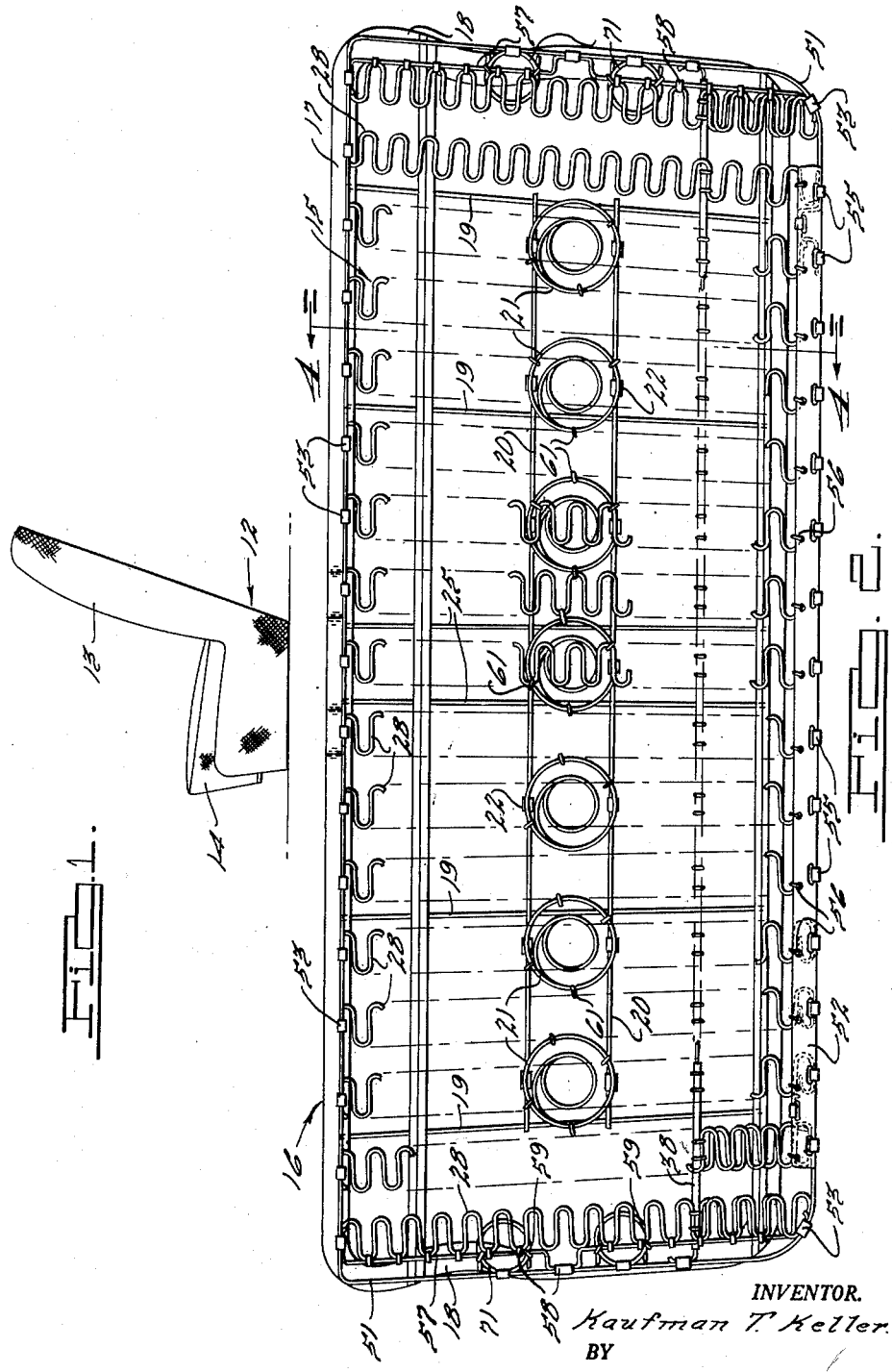
INVENTOR.
Kaufman T. Keller.
BY
Harness and Harris
ATTORNEYS.

INVENTOR.
Kaufman T. Keller
BY
Harness and Harris
ATTORNEYS.

Patented Apr. 13, 1954

2,675,065

UNITED STATES PATENT OFFICE 2,675,065

SPRING CUSHION STRUCTURE

Kaufman T. Keller, Detroit, Mich., assignor to Chrysler Corporation, Highland Park, Mich., a corporation of Delaware Application August 14, 1948, Serial No. 44,252

10 Claims. (Cl. 155—179)

This invention relates in general to spring constructions for upholstered furniture and more particularly to unitary spring cushion structures adapted for use in the seat and back units of automobile seat constructions.

The use of flat, sinuously shaped, wire spring strips to form the upholstery supporting surface of vehicle spring cushion structures, has become quite prevalent but such spring cushion structures have been characterized by certain disadvantages which the present invention overcomes. Sinuous spring strips, archedly supported on a rigid base frame, have been found to provide a very resilient supporting surface but one that is liable to bottom or deflect undesirably under concentrated loads if it has the requisite softness. It has also been found that soft, sinuous spring strip supporting surfaces have a tendency to sway and vibrate to such an extent that they give an insecure and uncomfortable feeling to the person seated thereon. The above-noted characteristics are quite pronounced in vehicle seat constructions due to the fact that the springs of vehicle seat constructions transmit the motions imparted to the seat by the road wheels in addition to those caused by the person resting on the seat unit.

It is a primary object of my invention to provide a soft, resilient spring cushion structure formed from sinuous spring strips in which "bottoming" and undesirable deflections of the spring supporting surface are prevented due to the incorporation of reinforcing coil springs beneath those portions of the supporting surface adapted to bear the heavier loads.

It is a further object of this invention to construct a spring cushion structure by forming the supporting surface from sinuously shaped spring strips of predetermined supporting characteristics and to then provide for supplementation of those characteristics by the use of reinforcing coil springs having known properties.

It is another object of my invention to provide a spring cushion structure including a sinuous spring strip supporting surface wherein coil spring means are combined with the spring strips to increase the rigidity and resistance to deflection at any selected area of the supporting surface.

It is a further object of this invention to provide a spring cushion structure with a relatively soft supporting surface yet one in which highly concentrated loads are firmly supported.

It is a still further object of this invention to provide a spring cushion structure formed from sinuous spring strips arched across a rigid base frame wherein tie means are provided for retaining the contour of the supporting surface at all times, such means also serving to damp out vibrations of the supporting surface.

It is still another object of this invention to provide a spring cushion structure comprising a sinuous spring strip supporting surface and coil spring reinforcing elements therefor wherein the rigidity and supporting characteristics of the supporting surface may be quickly and easily varied by interchanging the reinforcing coil springs with coil springs of different sizes and/or different degrees of stiffness.

Other objects and features of novelty of my invention will be either specifically pointed out or will become apparent from the following description taken in conjunction with the accompanying drawings wherein:

Fig. 1 is a side view, in elevation, of a seat construction formed from spring cushion structures embodying the features of my invention;

Fig. 2 is a plan view, with portions broken away, of the spring cushion structure incorporated in the seat unit of the construction shown in Fig. 1.

Figure 3:
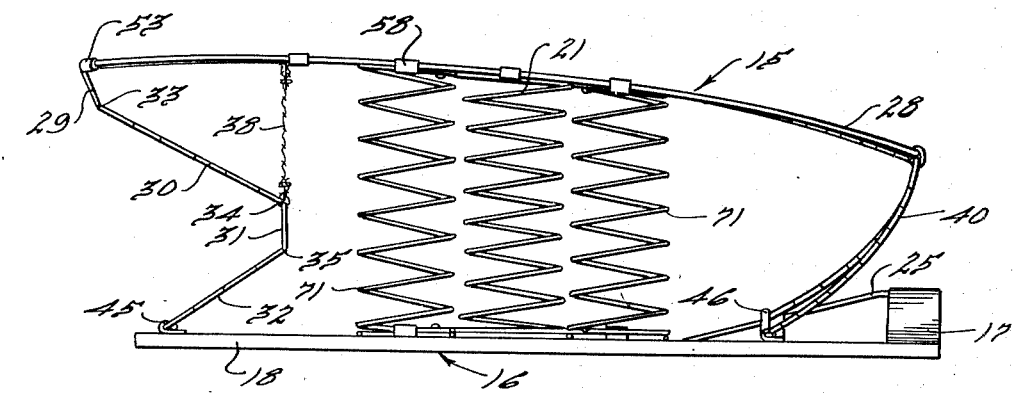
Fig. 3 is an end elevation of the spring cushion structure shown in Fig. 2.
Figure 4:
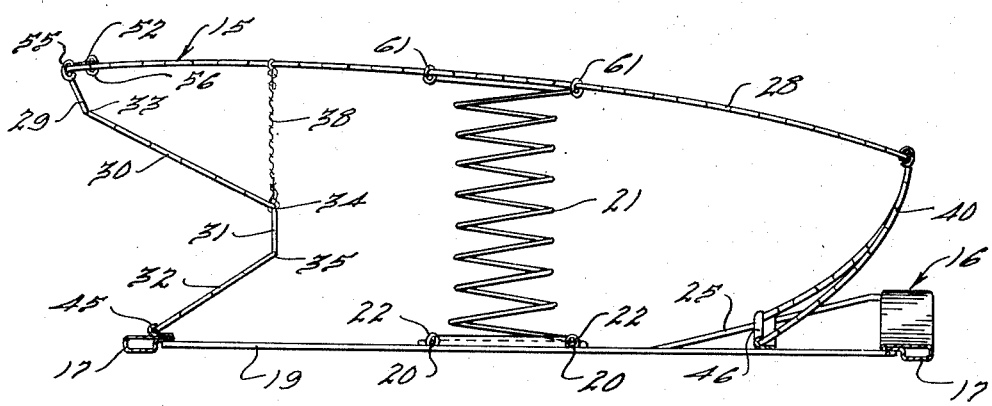
Fig. 4 is a vertical sectional view of my spring cushion structure taken along the line 4—4 of Fig. 2.

Fig. 1 illustrates a seat construction 12 comprising a back unit 13 and a seat cushion unit 14 each of which includes a spring cushion structure 15 embodying the features of my invention. Figs. 2 to 4, inclusive, show the spring structure 15 for the seat cushion unit which structure is substantially identical to the spring structure for the back unit 13.

The spring structure 15, illustrated in Figs. 2 to 4, inclusive, comprises a rigid base frame 16 of substantially rectangular shape. Frame 16 is formed from hollow, box-like metallic side rails 17 connected together in spaced relationship by the similarly formed end rails 18. Connected between the side rails 17, in longitudinally spaced relationship, are a plurality of transversely extending tie rods 19 and 25. Supported by and extending at right angles to the tie rods 19 and 25 are a plurality of longitudinally extending tie rods 20. The tie rods 19, 20 and 25 are arranged such that they form a suitable supporting means for the bottom end coils of the helical coil springs 21 mounted thereon. Tubular metal clips 22 connect the bottom end coils of the helical coil springs 21 to the longitudinally extending tie rods 20 in such a manner as to prevent tilting of the end coils relative to the tie rods. The connection of the springs 21 to the supporting tie rods 20 is such that the springs 21 may be easily replaced with other springs of different properties, such as size and stiffness, if it is desired to vary the supporting characteristics of the upholstery supporting surface located above the surface reinforcing coil springs 21.

In the particular embodiment herein illustrated the rear side rail 17 has an upwardly arched central portion adapted to fit the contour of the framework on which the seat unit is to be mounted. The transversely extending tie rods 25 connect this arched portion of the rear side rail 17 to the front side rail just as the tie rods 19 connect the parallel portions of the front and rear side rails.

Archedly spanning the space between the front and rear side rails 17 of the base frame 16 are a plurality of flat, transversely spaced, longitudinally extensible, sinuously shaped, spring strips 28. Strips 28 are made of spring wire which is bent back and forth in such a manner that a sinuously shaped flat wire spring strip results. During fabrication, the strips 28 are arched longitudinally of their length so that they must be stretched in a manner that decreases their curvature when they are installed upon the base frame. This maintains the spring strips under tension at all times after they are installed and provides taut supporting surfaces along the central portion of the strips.

The front end of each spring strip 28 is shaped so that in side elevation it resembles a substantially fish-mouth or trapezoidal configuration (see Figs. 3 and 4). This configuration is particularly designed to provide a most advantageous supporting hinging portion for the forward edge of the spring strip. Such a hinge portion insures a soft forward edge for the upholstery supporting surface. At the same time the forward hinging portion cooperates with the hinging portion at the rear end of each strip such that the supporting surface of the spring unit will be depressed in a substantially horizontal plane when a load is applied to the supporting surface. Forward tilting of the load supporting surface of a spring structure, as when a person rests thereon, has been found to be quite undesirable due to the fact that it tends to press the upper forward edge of the spring supporting surface into the underside of the legs of the person resting thereon.

The fish-mouth hinge portion at the forward end of each spring strip comprises an upper, relatively short, downwardly and rearwardly sloping hinge arm 29, a relatively long downwardly and rearwardly sloping hinge arm 30, a short substantially vertical central hinge arm 31, and a lower, relatively long, forwardly and downwardly sloping hinge arm 32. As a result of the specific shape of the forward hinging portion of the spring strip, the shearing and torsional stresses set up within the hinge joints 33, 34 and 35, during loading of spring strips, are greatly reduced. This is due to the fact that the hinging action is divided between the three joints 33, 34 and 35 instead of a single hinge joint as is the usual case with the conventional V-shaped forward hinging portion.

To assist in distributing the torsional stresses between the several hinge joints and to also damp out vibrations of the upper spring supporting surface, a fabric tie strip 38 is connected between the hinge joint 34 and the portion of the supporting surface normally lying above the joint 34. Damping strip 38 also serves as a strip supporting surface as it anchors the surface to the hinging joint 34 and this restrains the supporting strip against its upwardly arching tendencies resulting from its fabricated longitudinal curvature.

The rear end of each spring strip 28 is formed with a downwardly and forwardly curved hinging portion 40 which cooperates with the fish-mouthed forward hinging portion in such a manner as to assure a substantially level depression of the spring supporting surface when a load is applied thereto.

The front and rear free ends of each spring strip 28 are connected to the base frame 16 by means of U-shaped, anchor rails 45 and 46 respectively. The straight portions of the spring strip ends are placed in the bight portions of the U-shaped anchor rails 45, 46 and then the leg portions of the U-shaped anchor rails are bent about the ends of spring strips to lock them in assembled position.

Extending about the periphery of the upholstery supporting surface is a top border frame comprising a substantially U-shaped border wire 51 between the free ends of which a flat marginal strip 52 is connected. The U-shaped border wire 51 extends along the side and rear edges of the spring supporting surface while the marginal strip 52 extends along the front edge of the supporting surface. Tubular metal clips 53 connect the border wire 51 to the spring strips 28. The marginal strip 52 is connected to the spring strips 28 by the tubular metal clips 55 and the hog rings 56. Marginal frame 52 provides a broad, firm, supporting surface for the upholstery padding mounted along the forward edge of the spring structure.

Along the side edges of the spring structure 15 there are mounted a plurality of marginal coil springs 71. These springs 71 are connected between the base frame 16 and the side edges of the upper spring supporting surface. Springs 71 tend to stiffen the side edges of the spring structure and maintain the upholstery in a taut condition on the spring structure. To further assist in the stiffening of the side edges of the spring structure, stiffener rods 57 are mounted above the stiffener springs 71. Stiffener rods 57 are connected to the border wire 51 and the adjacent spring strip 28 by metal clips 58. Hog rings 59 also connect the rods 57 to the stiffener springs 71.

The helical supporting surface, reinforcing springs 21, mounted between the main load supporting portions of the spring strip supporting surface and the tie rods of the base frame 16, are connected to the upper spring supporting surface by hog rings 61. The springs 21 not only reinforce the load supporting portions of the spring surface but they also tend to damp out vibrations of the supporting surface and help to restrict the curvature of the spring unit supporting surface.

By forming the spring structure supporting surface from a plurality of sinuously shaped, pretensioned, spring strips, having soft resilient supporting characteristics, and then reinforcing the load bearing portions of this supporting surface with coil springs, or other resilient means, that add certain desired properties to the load supporting area of the supporting surface, I have provided an improved spring structure that is soft enough to provide a pleasant, relaxing support yet rigid enough to properly support the load applied. Furthermore the specific arrangement of elements herein disclosed guides, controls and reinforces the supporting surface in such a manner that the spring structure is not subject to swaying, tilting or excessive vibration or deflections. In addition this construction is such that the characteristics of the supporting surface may be easily altered by the replacing of springs 21 with springs of different load supporting characteristics, to meet the particular load supporting requirements.

I claim:

1. In a spring structure, a base frame comprising interconnected pairs of side and end rails, tie rods supported by the base frame rails and arranged substantially in the plane thereof, longitudinally extensible, sinuously shaped, resilient wire spring strips arcuately spanning said frame and having the integrally formed ends thereof rigidly connected thereto, each spring strip including an arched, longitudinally extending, resilient upholstery supporting surface, an underlying spring strip supporting, rearwardly extending, hinge portion of fish-mouthed elevational configuration connected between the forward edge of said resilient upholstery supporting surface and said frame and an underlying, spring strip supporting, downwardly and forwardly curved hinge portion connected between the rear edge of said resilient upholstery supporting surface and said frame, compression type coil springs connected to and mounted between said tie rods and the resilient upholstery supporting surfaces of the spring strips so as to reinforce and rigidify the overlying upholstery supporting surfaces, and tie means connected between the rearwardly extending hinge portions at the forward edges of said strips and the overlying, resilient, upholstery supporting surfaces, said tie means being adapted to damp the vibration of and control the deflection of the resilient upholstery supporting surfaces.

2. In a spring structure, a base frame comprising interconnected pairs of side and end rails, tie rods supported by the base frame rails, U-shaped anchor rails carried by said base frame and arranged substantially parallel to a pair of oppositely disposed rails thereof longitudinally extensible, sinuously shaped, resilient, wire spring strips arcuately bridging said frame and having the integrally formed ends thereof rigidly connected to said anchor rails, each spring strip including a portion providing an arched resilient upholstery supporting surface, a downwardly extending spring strip supporting portion of trapezoidal elevational configuration connected between the forward edge of said resilient upholstery supporting surface and said frame, and a downwardly extending spring strip supporting portion of curved elevational configuration connected between the rear edge of said upholstery supporting surface and said frame, a border frame connected about the peripheral portion of the spring structure upholstery supporting surface, coil springs connected to and mounted between the base frame end rails and the overlying portions of said border frame and spring strip upholstery supporting surface to rigidify the end portions of the spring structure, and coil springs connected to and mounted between the tie rods and those portions of the resilient upholstery supporting surfaces of said spring strips adapted to support the majority of the load applied to the supporting surface, whereby the supporting characteristics of these last-named portions are altered without material effect on the other portions of the spring strip supporting surface.

3. A spring structure comprising in combination a base frame, a plurality of elongated, sinuously shaped, longitudinally extensible, resilient, spring strips arcuately bridging said frame and having the integrally formed ends thereof rigidly attached thereto, each of said spring strips embodying an arched, resilient, load supporting surface spaced above said frame, a yieldable, downwardly and forwardly curved hinge portion underlying and supporting the rear edge of said supporting surface on said frame and a yieldable rearwardly extending, hinge portion of substantially fish-mouth elevational configuration underlying and supporting the forward edge of said supporting surface on said frame, a plurality of compression type coil springs mounted on and connected to said base frame so as to extend between said frame and those portions of the resilient load supporting surfaces requiring increased resistance to deflection, and tie means connected between the nose of each of said fish-mouth hinge portions and the overlying load supporting surfaces adapted to damp out vibrations of said resilient load supporting surfaces and to guide the deflection of those load supporting surfaces when loads are applied thereto.

4. A spring structure comprising a base frame formed from connected pairs of spaced, oppositely arranged, side and end rails having spaced tie rods supported by said rails, and a plurality of flat, sinuously shaped, longitudinally extensible, wire spring strips arcuately spanning said frame and connected to said base frame, each strip comprising an arched, resilient, load supporting portion, an integral, resilient hinging portion depending from and adapted to yieldably support the forward edge of said supporting portion, the forward hinging portion comprising an upper relatively short, rearwardly and downwardly sloping hinge arm, a relatively long, rearwardly and downwardly sloping hinge arm extending from said short arm, a short, substantially vertically extending hinge arm extending from said long arm, and a relatively long, forwardly and downwardly sloping lower hinge arm extending from said vertical arm, and an integral, resilient, rear hinging portion depending from and adapted to yieldably support the rear edge of said strip load supporting portion comprising a forwardly and downwardly extending, curved, hinge arm, tie means connected between said vertically extending hinge arms and the overlying load supporting portions of said spring strips and coil springs mounted on the tie rods and arranged to extend between and connect the tie rods and the load supporting portions of the spring strips to provide a means for controlling rigidity and deflection of said strip.

5. In a spring structure, a base frame comprising interconnected pairs of side and end rails, tie rods supported by the base frame rails and arranged substantially in the plane thereof, a plurality of longitudinally extensible, sinuously shaped, wire spring strips arcuately spanning said frame having the integrally formed opposite ends thereof rigidly connected to oppositely arranged base frame rails, each spring strip including an arched, longitudinally extending, upholstery supporting surface, a strip supporting hinge portion at one end of each spring strip upholstery supporting portion connected to said base frame comprising an upper relatively short, rearwardly and downwardly sloping hinge arm extending from said upholstery supporting portion, a relatively long, rearwardly and downwardly sloping hinge arm extending from said short arm, a short, substantially vertically extending hinge arm extending from said long arm, and a relatively long, forwardly and downwardly sloping lower hinge arm extending from said vertical arm and connected to said base frame and a strip supporting downwardly and forwardly curved hinge portion connected between the other end of each spring strip upholstery supporting portion and said frame, compression type coil springs mounted between said tie rods and the upholstery supporting surfaces of the spring strips so as to reinforce and rigidify the overlying upholstery supporting surfaces, and tie means connected between the rearwardly and downwardly sloping portions of the hinge portions at the said one end of said spring strips and the overlying upholstery supporting surfaces, said tie means being adapted to damp the vibration of and control the deflection of the upholstery supporting surfaces.

6. In a spring structure, a base frame comprising interconnected pairs of side and end rails, tie rods supported by the base frame rails arranged so as to provide a coil spring supporting surface, longitudinally extensible, sinuously shaped, resilient, wire spring strips arcuately spanning said base frame having integrally formed end portions rigidly connected to said base frame, each spring strip including an arched portion providing an upholstery supporting surface, an underlying, resilient, spring strip supporting hinge portion connected between the forward edge of said upholstery supporting surface and said frame comprising an upper relatively short, rearwardly and downwardly sloping hinge arm extending from said upholstery supporting portion, a relatively long, rearwardly and downwardly sloping hinge arm extending from said short arm, a short, substantially vertically extending hinge arm extending from said long arm, and a relatively long, forwardly and downwardly sloping lower hinge arm extending from said vertical arm and connected to said base frame and an underlying, resilient, strip supporting hinge portion connected between the rear edge of said upholstery supporting surface and said frame, and compression type coil springs connected to and mounted between said coil spring supporting surface and the resilient upholstery supporting surfaces of said spring strips, said coil springs being located beneath the portions of the upholstery supporting surfaces intended to carry the greater loads so as to increase the resistance to deflection of these portions of the upholstery supporting surfaces without materially affecting the supporting characteristics of the other portions of the spring strip.

7. In a spring structure, a base frame comprising interconnected pairs of side and end rails, tie rods supported by the base frame rails, U-shaped anchor rails carried by said base frame and arranged substantially parallel to a pair of oppositely disposed rails thereof, longitudinally extensible, sinuously shaped, wire spring strips arcuately bridging said frame and having the integrally formed ends thereof rigidly connected to said anchor rails, each spring strip including a portion providing an arched upholstery supporting surface, a depending strip supporting portion of substantially V-shaped side elevational configuration connected between the forward edge of said upholstery supporting surface and said frame, comprising an upper relatively short, rearwardly and downwardly sloping hinge arm extending from said upholstery supporting portion, a relatively long, rearwardly and downwardly sloping hinge arm extending from said short arm, a short, substantially vertically extending hinge arm extending from said long arm, and a relatively long, forwardly and downwardly sloping lower hinge arm extending from said vertical arm and connected to said base frame and a depending strip supporting portion of curved elevational configuration connected between the rear edge of said upholstery supporting surface and said frame, a border frame connected about the peripheral portion of the spring structure upholstery supporting surface, coil springs mounted between the base frame end rails and the overlying portions of said border frame and spring strip upholstery supporting surface to rigidify the end portions of the spring structure, and coil springs mounted on and connected between the tie rods and those overlying portions of the upholstery supporting surfaces of said spring strips adapted to support the majority of the load applied to the supporting surface, whereby the supporting characteristics of these last-named portions are altered without material effect on the other portions of the spring strip supporting surface.

8. A spring structure comprising in combination a base frame having spaced, oppositely arranged rails, rigid tie rods supported by said rails substantially in the plane of said rails, a plurality of longitudinally extensible, sinuously shaped, wire spring strips arcuately spanning opposite sides of said frame with the integrally formed end portions of said strips fixedly connected to the base frame adjacent oppositely arranged rails thereof, each spring strip including a load supporting surface spaced above said frame and depending inwardly extending, strip supporting hinging portions at each end thereof connecting said load supporting surface to the base frame, one of said hinging portions comprising an upper relatively short, rearwardly and downwardly sloping hinge arm extending from said upholstery supporting portion, a relatively long, rearwardly and downwardly sloping hinge arm extending from said short arm, a short, substantially vertically extending hinge arm extending from said long arm, and a relatively long, forwardly and downwardly sloping lower hinge arm extending from said vertical arm and connected to said base frame, coil spring elements disposed between said tie rods and the load supporting surfaces of said spring strips so as to reinforce the overlying portions of the load supporting surfaces, and tie means extending between at least one of the inwardly extending strip supporting hinging portions and the overlying load supporting surfaces.

9. A flat, sinuously shaped, longitudinally extensible, wire spring strip for spring structures comprising a resilient load supporting portion, an integral, resilient hinging portion of substantially V-shaped configuration underlying the forward edge of the resilient load supporting surface and adapted to yieldably support the superimposed forward edge of said load supporting portion, the forward hinging portion comprising an upper relatively short, downwardly sloping hinge arm, a relatively long rearwardly and downwardly sloping hinge arm extending from said short downwardly sloping arm, a short, substantially vertically extending hinge arm extending from said rearwardly and downwardly sloping long arm, and a relatively long, forwardly and downwardly sloping lower hinge arm extending from said vertical arm, flexible tie means extending between portions of the forward hinging portion and the superimposed load supporting surface, and an integral, resilient, rear hinging portion underlying the rear edge of the resilient load supporting surface and adapted to yieldably support the rear edge of said strip load supporting portion comprising a forwardly and downwardly extending hinge arm.

10. A spring structure comprising a base frame having oppositely arranged rails and a plurality of elongated longitudinally extensible, resilient, sinuously shaped, spring strips arcuately spanning said frame and having the integrally formed ends thereof attached thereto, each of said spring strips embodying a resilient load supporting surface beneath the ends of which there are resilient, hinge-like, strip attachment and supporting means, one of said means underlying one end of the strip and being substantially V-shaped in cross-sectional configuration and the other of said attachment means underlying the other end of the strip and curving inwardly and downwardly beneath the resilient load supporting surface, tie means connected between the vertex portion of said substantially V-shaped means and said overlying resilient load supporting surfaces, and compression type coil spring elements mounted on and connected between portions of said resilient load supporting surfaces and said frame adapted to rigidify those portions of the load supporting surfaces adjacent said coil springs without materially changing the supporting characteristics of the other portions of the resilient load supporting surfaces.

References Cited in the file of this patent
UNITED STATES PATENTS

| Number | Name | Date |
|---|---|---|
| 133,102 | Hollings | Nov. 19, 1872 |
| 491,162 | Edwards | Feb. 7, 1893 |
| 605,095 | Gardiner | June 7, 1898 |
| 2,177,175 | Freund | Oct. 24, 1939 |
| 2,186,548 | Lotz | Jan. 9, 1940 |
| 2,255,958 | Asaro et al. | Sept. 16, 1941 |
| 2,265,251 | Reed | Dec. 9, 1941 |
| 2,291,429 | Wolfe | July 28, 1942 |
| 2,407,933 | Neely | Sept. 17, 1946 |
| 2,526,184 | Williams | Oct. 17, 1950 |